United States Patent
Mossoba et al.

(10) Patent No.: US 12,401,649 B2
(45) Date of Patent: Aug. 26, 2025

(54) SYSTEMS AND METHODS FOR VALIDATING NETWORK OPERATIONS RELATED TO USE OF A TOKEN VIA A TOKEN REQUEST BASED ON ENTITY CHARACTERISTICS

(71) Applicant: Capital One Services, LLC, McLean, VA (US)

(72) Inventors: Michael Mossoba, Great Falls, VA (US); Tyler Maiman, Melville, NY (US); Joshua Edwards, Philadelphia, PA (US)

(73) Assignee: Capital One Services, LLC, McLean, VA (US)

(*) Notice: Subject to any disclaimer, the term of this patent is extended or adjusted under 35 U.S.C. 154(b) by 349 days.

(21) Appl. No.: 17/822,035

(22) Filed: Aug. 24, 2022

(65) Prior Publication Data
US 2024/0073214 A1    Feb. 29, 2024

(51) Int. Cl.
*H04L 9/40* (2022.01)
(52) U.S. Cl.
CPC ........ *H04L 63/102* (2013.01); *H04L 63/0884* (2013.01); *H04L 63/1416* (2013.01)
(58) Field of Classification Search
CPC .............. H04L 63/102; H04L 63/0884; H04L 63/1416; H04L 63/0807
See application file for complete search history.

(56) References Cited

U.S. PATENT DOCUMENTS

| | | | |
|---|---|---|---|
| 2008/0243702 A1* | 10/2008 | Hart | H04L 9/3234 705/69 |
| 2015/0332414 A1* | 11/2015 | Unser | G06F 16/285 705/30 |
| 2022/0222704 A1* | 7/2022 | Knudsen | G06Q 30/0255 |
| 2023/0179587 A1* | 6/2023 | Wilson Thampi | H04L 63/083 726/9 |
| 2023/0259695 A1* | 8/2023 | Woolf | G06Q 30/0251 715/234 |

* cited by examiner

*Primary Examiner* — Trong H Nguyen
(74) *Attorney, Agent, or Firm* — Foley & Lardner LLP

(57) ABSTRACT

In some embodiments, validation of network operations related to use of a token via a token request based on entity characteristics may be facilitated. In some embodiments, a token request indicating use of a token to access an item associated with an entity may be detected, where the token is bound to one or more entity characteristics. Based on the token request, an entity identifier associated with the entity may be obtained. Using the entity identifier, one or more item characteristics of items available via the entity may be determined. Determining whether the entity satisfies the one or more entity characteristic to which the token is bound may be determined based on the one or more item characteristics. Access to the item associated with the entity may be validated based on the determination indicating that the entity satisfies the one or more entity characteristics to which the token is bound.

20 Claims, 4 Drawing Sheets

SYSTEMS AND METHODS FOR VALIDATING NETWORK OPERATIONS RELATED TO USE OF A TOKEN VIA A TOKEN REQUEST BASED ON ENTITY CHARACTERISTICS

SUMMARY

In one aspect, methods and systems are described herein for improvements related to validating network operations based on entity characteristics. As an example, methods and systems are described herein for validating network operations (e.g., a user requesting access to one or more items) using an access token that is bound to one or more entity characteristics (e.g., non-malicious entity, safe entity, entity aligned with token attributes of the token, etc.).

In the context of existing access tokens and web services, in response to a user logging into a web service of an entity, the web service issues a token (e.g., JSON web token or other token) to the user device. Each subsequent request of the user device to the web service will include the token, allowing the user to access services and other resources that are permitted with that token based on an authorization of the requests. In one use case, where the web service is a content aggregation platform, the token would enable the user to access resources of many different third-party entities, subject to the user's account with the aggregation platform already having the corresponding access rights. Such access may, for example, include access to resources (e.g., items) of many different third-party entities without the user having to manually log in to the aggregation platform for each access request from the user device. However, a user may want to restrict access to one or more resources based on the entity the user is attempting to access resources through to protect sensitive information, prevent malicious uses of the resources or services (e.g., preventing a data breach), or avoid other inadvertent usage of a token unaligned with an intent of the user for use of the token.

For instance, existing systems may restrict access to items associated with malicious entities based on an identifier associated with the entity (e.g., a uniform resource locator (URL), an entity name, or other identifier associated with the entity). In some cases, these malicious entities may mask their identity, for example, by using a URL that is semantically similar to a non-malicious entity or by using a fake entity identifier all together. This may confuse existing validation platforms and may allow the user to access items from such malicious entities, which in turn, may leave the user vulnerable to a data breach or other personal information stolen from the user. As such, this may lead to a poor user experience and raise security concerns as the user may reasonably expect that their sensitive information is protected.

To overcome this, in some embodiments, restricted access tokens may be implemented in a manner related to characteristics of entities with which the tokens are used. For example, restricted access tokens may restrict actions that are related to accessing resources (or other items) based on characteristics of entities that are associated with the item to be accessed. For example, by binding an access token to entity characteristics (as opposed to an entity identifier), the system may determine if the entity (to which items are attempted to be accessed through) satisfies one or more of the entity characteristics bound to the access token. Additionally, the system may determine whether the entity satisfies one or more entity characteristics (e.g., to which the token is bound) by determining characteristics of items available via the entity. For example, the items available via the entity may be indicative as to one or more characteristics of the entity (e.g., an item may be an illegal item, and thus, the entity may be an illegally operating entity). In this way, by determining (i) item characteristics of items available via the entity and (ii) whether the entity satisfies one or more entity characteristics to which the token is bound, the system may provide improved validation of actions related to the use of a token, thereby improving the user experience and providing increased data security as the user may only access items via entities that satisfy the one or more entity characteristics to which the token is bound.

In some embodiments, the system may detect a token request indicating use of a token (e.g., which is bound to one or more entity characteristics) to access an item associated with an entity. Based on the token request, the system may obtain an entity identifier associated with the entity. The system may determine, based on the obtained entity identifier, one or more item characteristics of items available via the entity. Using the one or more item characteristics, the system may determine whether the entity satisfies the one to more entity characteristics to which the token is bound. Based on the determination indicating that the entity satisfies the one or more entity characteristics (e.g., to which the token is bound), the system may enable access to the item associated with the entity.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
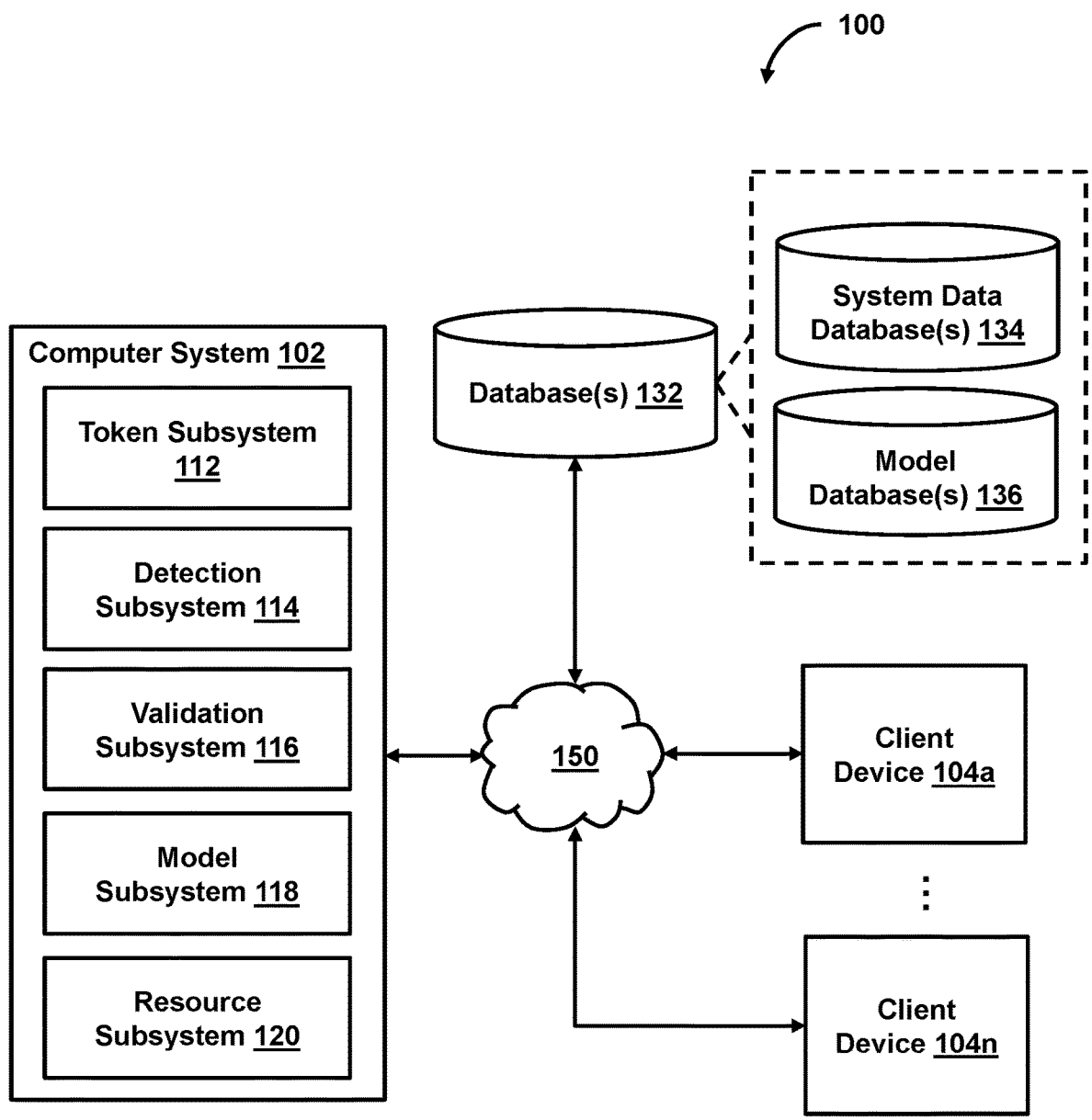
FIG. 1 shows a system for validating network operations related to use of a token via a token request based on entity characteristics, in accordance with one or more embodiments.

FIG. 1 shows a system 100 for validating network operations related to use of a token via a token request based on entity characteristics, in accordance with one or more embodiments. As shown in FIG. 1, system 100 may include computer system 102, client device 104 (or client devices 104a-104n), or other components. Computer system 102 may include token subsystem 112, detection sub system 114, validation sub system 116, model sub system 118, resource sub system 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. As used herein, "mobile device," "user device," and "client device" may be used interchangeably unless context dictates otherwise. Additionally, it should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may validate one or more network operations related to use of a token. For example, validating network operations may include any validation process for authorizing or enabling an action (e.g., accessing resources, logging into a website, streaming content, etc.) that occurs over one or more computing networks. For instance, system 100 may validate access to an item associated with an entity based on the entity satisfying one or more entity characteristics to which the token is bound. Entities, such as companies, merchants, service providers, organizations, or other entities, are often associated with entity characteristics that are related to the items they provide. As an example, a web merchant providing software may be a "trustworthy entity" because the software they provide is safe to use and download. However, other entities may be malicious in nature. For example, another web merchant providing other software may be a "malicious entity" because the software the other web merchant provides is laced with viruses to steal a user's data. When a user attempts to log into an interface associated with the entity using an access token (e.g., identifying user credentials), system 100 may determine whether the entity to which they are attempting to interact with (or access an item associated with the entity) satisfies one or more entity characteristics to which the token is bound. In this way, the system may provide improved data security while improving the user's experience knowing that the system may only provide access to the items when the entity is known as "safe" or "trustworthy."

In some embodiments, system 100 may detect a token request indicating use of a token which is bound to one or more entity characteristics. For example, the token request may be a request indicating use of the token to access an item associated with an entity. The token may be any token that allows the performance of one or more actions, limited to entities that satisfy entity characteristics to which the token is bound. The entity characteristics may be any characteristic of an entity that describes or is otherwise related to features or qualities of an entity. For example, an entity characteristic may be "safe," "trustworthy," "non-malicious," or other feature or quality that describes the entity. Such entity characteristics may be related to one or more items (or characteristics of the items) that the entity hosts. For example, an entity that provides access to pirated movies (e.g., illegal content) may have the entity characteristic of "illegal operating entity." System 100 may determine such item characteristics to determine whether an entity (e.g., to which a user is attempting to access items through) satisfies entity characteristics to which the token is bound. Based on the entity satisfying one or more of the entity characteristics to which the token is bound, system 100 may validate access to the item. In this way, the user may only access items associated with entities that satisfy entity characteristics to which the token is bound, thereby improving the user experience and increasing system security.

As an example, system 100 may detect a token request indicating use of a token bound to one or more entity characteristics. The request may indicate that the user is attempting to log into a website associated with an entity with the token. The token may be bound to entity characteristics such as "trustworthy," "safe," "legal content," or other entity characteristics designed to protect the user (e.g., from a data breach) or to otherwise restrict access to accessing items from entities that do not conform to entity characteristics to which the token is bound. Based on the token request, system 100 may obtain an entity identifier associated with the entity. For example, the entity identifier may be a name or other identifying information related to the entity. Using the entity identifier, system 100 may determine item characteristics of items available via the entity. For example, system 100 may determine such item characteristics by performing natural language processing on a webpage of the entity (or otherwise related to the entity), perform web scraping using entity information (e.g., an entity identifier, entity characteristic information, or other information), query a database storing item characteristics of entities, or other methods.

System 100 may then determine, based on the determined item characteristics, whether the entity satisfies one or more entity characteristics to which the token is bound. For instance, a good indicator of the characteristics of the entity may be based on the items to which the entity sells. As some entities may attempt to hide negative entity characteristics (e.g., such as being malicious, fake, or unsafe), item characteristics of items available via the entity may reveal characteristics of the entity as a whole. System 100 may then enable access to the item associated with the entity (e.g., provide the item to the user, allow the user to log into the web site associated with the entity, or otherwise authorize access to the item or resource) where the entity satisfies the one or more entity characteristics to which the token is bound. In this way, the system may provide enhanced security (e.g., by the entity and/or the item characteristics of the entity satisfying entity characteristics to which the token is bound) while ensuring that the entity is not misclassified (e.g., by using item characteristics as opposed to entity characteristics of the entity providing an item the user is attempting to access).

In some embodiments, detection subsystem 114 may detect a token request. For example, a token request may be any request related to the use of a token. As explained above, tokens may be used for accessing content (e.g., resources, services, items, etc.). The token request may indicate use of the token to access an item associated with an entity. For example, a user may navigate to a website (e.g., associated with an entity) to gain access to an item by using the token (e.g., by logging into an account associated with the website). In such a case, when the user logs into the website, a token request may be transmitted from the user's device (or a web browser application on the user's device) that includes the token. For example, the token request may include information pertaining to the use of the token, such as (i) one or more items to be accessed, (ii) entity information (e.g., to which the item(s) are being accessed from), (iii) a token identifier (e.g., a value or other identifier associated with the token that identifies the token), (iv) token parameters, or other token request related information.

The token (and other token related information) may be stored in a storage associated with token subsystem 112. Token subsystem 112 may store a set of tokens, where each token of the set of tokens includes a set of token parameters. As a token may be used for a unique purpose (e.g., interacting with a single entity, accessing items from a single entity), or additionally, where a token is used for multiple purposes (e.g., interacting with multiple entities, accessing items from multiple entities, etc.), each token may include token parameters that are related to how the token may be used and which entity characteristics are associated with a given token. For example, token parameters may include information such as an account the token is linked to (e.g. a token identifier, an account identifier, an account number, or other account-related information), a user identifier (e.g., a value or other identifier that indicates a user that is associated with the token), one or more entity characteristics (e.g., characteristics of entities to which the token is bound), an expiration parameter (e.g., a date/time where the token may be used for accessing an item, a date/time range where the access token may be used for accessing an item, etc.), one or more timestamp parameters (e.g., a time/date at which an item associated with the entity is accessed, a time/date at which an item associated with the entity is acted upon, etc.), or other parameters. In this way, a token may be associated with an intended use of the token, such that actions (e.g., accessing items associated with an entity, or other interactions) may be restricted to those based on the parameters or other characteristics to which the token is bound. Thus, each time detection subsystem 114 detects a token request from a user, detection subsystem 114 may determine which token is being used (e.g., via the token identifier or other account identifier) and the entity characteristics to which the token bound.

Figure 2:
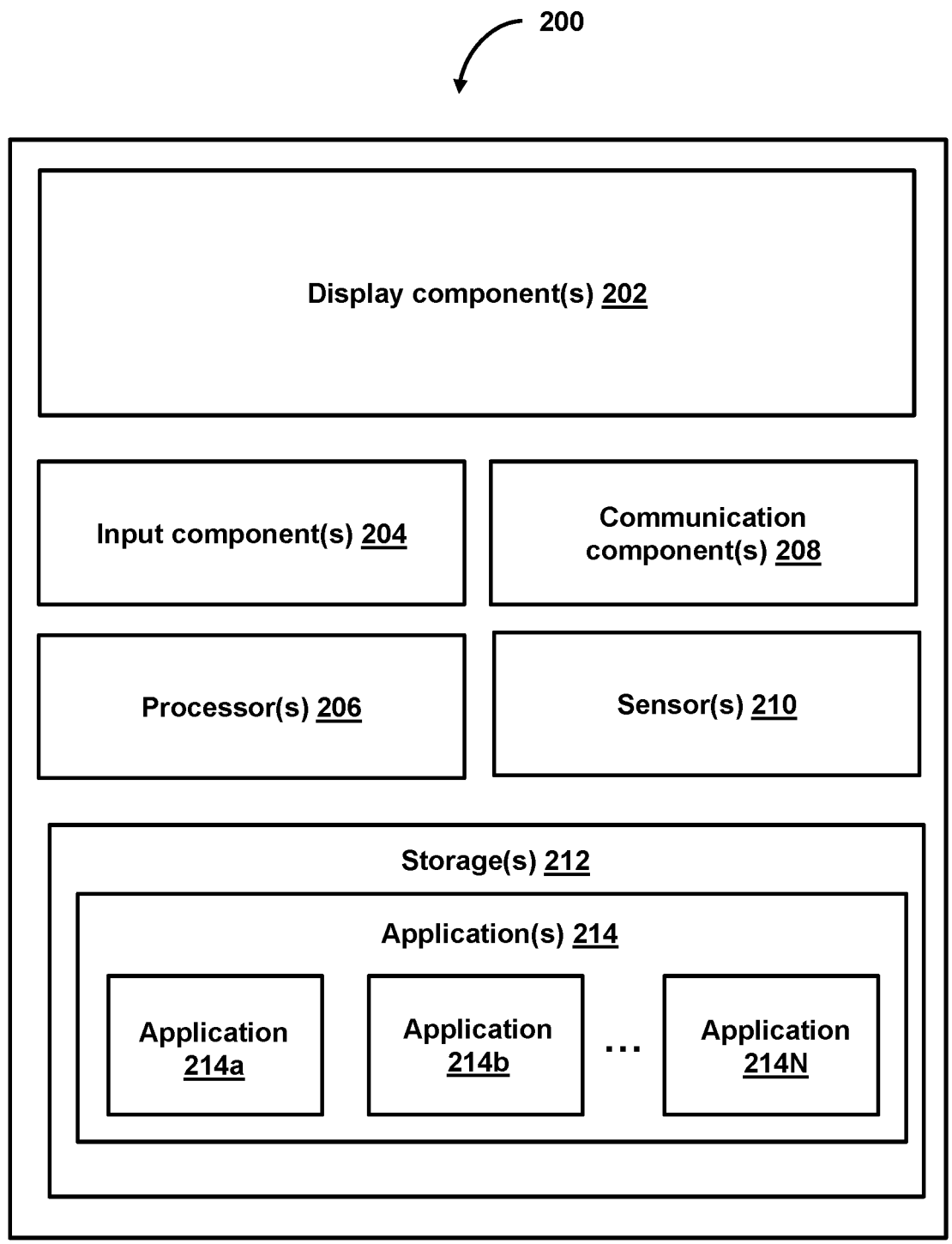
FIG. 2 shows a client device, in accordance with one or more embodiments.

In some embodiments, with respect to FIG. 2, one or more operations for validating network operations related to use of a token via a token request based on entity characteristics may be performed by client device 200. In some embodiments, client device 200 may correspond to client device 104 (FIG. 1). Client device 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications. For example, applications 214a-214n may represent different applications stored on client device 200. As another example, application 214a may be an application that is configured as a web browser or other application for providing access to one or more items related to one or more network operations via network 150. In some embodiments, communication components 208 may be configured for receiving or transmitting one or more network operations (e.g., token requests), receiving or transmitting one or more messages (e.g., text messages, emails, instant messages, etc.), receiving or transmitting content (e.g., multimedia), communicating with one or more components of system 100, or other functions, in accordance with one or more embodiments.

Referring back to FIG. 1, detection subsystem 114 may detect a token request indicating use of the token to access an item associated with an entity. For example, the token request may be transmitted from a client device 104 over network 150 and detection subsystem 114 may detect the token request. Based on the token request, token subsystem 112 may obtain an entity identifier associated with the entity. For instance, token subsystem 112 may parse through the token request to obtain entity information included in the token request. The entity information may indicate an entity identifier such as an entity value (e.g., an alphanumeric value, numeric value, or other value), an entity name (e.g., a text string, alphanumeric string, etc.), an entity category (e.g., a general category of the entity), a uniform resource locator (URL) associated with the entity, or other entity-related information that identifies the entity.

In one use case, a user may navigate to a website associated with a streaming service (e.g., an entity) to watch a movie. When the user logs into the website (e.g., to access the movie), detection subsystem 114 may detect the token request. For example, the token request may include login credentials associated with the token, an entity identifier (e.g., such as a URL associated with the streaming service), and an item identifier (e.g., an identifier associated with the movie the user is attempting to watch). Detection subsystem 114 may communicate with token subsystem 112, and token subsystem 112 may parse through the information in the token request to obtain the URL associated with the entity.

In another use case, where the token is a virtual card number, a user may attempt to purchase a television through a merchant (e.g., an online merchant, a brick and mortar merchant, etc.) using the virtual card number. Detection subsystem 114 may detect the token request (e.g., a purchase request, a temporary authorization, etc.), where the token request includes a description including the virtual card number being used to complete the purchase, an entity identifier (e.g., identifying the merchant), and an item identifier (e.g., an identifier identifying the television). Detection subsystem 114 may communicate with token subsystem 112, and token subsystem 112 may parse through the token request description (or other information included in the token request) to obtain the name of the merchant.

In some embodiments, detection subsystem 114 may determine one or more item characteristics of items available via the entity. Such item characteristics may refer to features, qualities, or other characteristics of items and may be indicative of one or more characteristics of an entity (e.g., the entity to which the item is available). For example, an item that uses minimal packaging may be deemed as an "environmentally sustainable" item. To ensure that the entity to which the user is attempting to interact with (e.g., access an item from the entity) conforms with (or otherwise satisfies) the one or more entity characteristics to which the token is bound, characteristics of items available via the entity may be a strong indicator of the entity's overall characteristics. For instance, existing systems often rely on "allow lists" or "block lists" to prevent a user from accessing items from entities that are known to be malicious or that are otherwise restricted based on the binding of the token. However, such "allow lists" or "block lists" may easily be circumvented with some entities masking their identity. Furthermore, entities that were once restricted (e.g., as based on the token's binding characteristics) may become unrestricted (or vice versa). For instance, as entities constantly develop which items are made available, an entity that once appeared on a "block list" may be misclassified as system administrators of such existing systems fail to update the "allow list" or "block list." Thus, by using item characteristics to determine whether an entity conforms to entity characteristics to which the token is bound, the system may provide a more robust validation process leading to enhanced security and an improved user experience.

In some embodiments, detection subsystem 114 may perform web scraping to determine the one or more item characteristics. For example, detection subsystem 114 may perform web scraping based on the entity identifier. Web scraping may refer to extracting data from websites. For example, detection subsystem 114 may access the world wide web and perform web scraping using the entity identifier to determine item characteristics of the items available via the entity. Where the entity identifier is not a URL associated with the entity (e.g., the entity identifier is an entity code, an entity name, or other entity identifier), web scraping may prove to be advantageous as detection subsystem 114 need not rely on a single webpage or database storing information about the items to which a given entity makes available. Web scraping may scrape multiple websites, databases, web servers, or other web-based services for information pertaining to the items available via the entity. For example, the information pertaining to the items available via the entity may include information such as the legitimacy of the item, whether the item is illegal, whether the item is an environmentally sustainable item, whether the item conforms to a social standard (e.g., woman owned), or other information pertaining to a quality, feature, or standard of the item.

In one use case, where the entity identifier is a merchant name, detection subsystem 114 may perform web scraping based on the merchant name. During the web scraping, detection subsystem 114 may obtain information related to the items that the merchant sells. For example, where the merchant is a smart watch merchant, detection subsystem 114 may use the name of the merchant, for example, CompanyA, and perform web scraping based on the merchant's name to obtain information related to the products CompanyA sells. For example, the product information may include characteristics such as the types of products the merchant sells, whether the products are environmentally sustainable (e.g., the products use recyclable packaging, the manufacturing process for the products uses renewable energy, the products are made locally, etc.), whether the products are sourced from a particular demographic or standard (e.g., woman owned business, small business, local business, minority owned business, etc.), legitimacy of the product (e.g., fake or real), legality of the product (e.g., illegal or legal), ingredient/part information of a product (e.g., harmful chemicals, safe chemicals, radioactive materials, etc.) or other product information. Such product characteristic information may shed light on the characteristics of the entity as a whole. As such, as will be explained later, the item characteristics of items available via the entity may be used to determine whether the entity satisfies one or more entity characteristics to which the token is bound.

In some embodiments, detection subsystem 114 may perform natural language processing on a webpage associated with the entity to determine the one or more item characteristics. For example, as the entities providing items, products, or other services tend to "know" their products the best, performing natural language processing on the webpage of the entity may be advantageous to determining item characteristics of items available via the entity as most entity webpages include a variety of item information. As such, detection subsystem 114 may determine based on the entity identifier (e.g., from the token request), a URL associated with the entity. For instance, where the token request does not include an entity identifier in the form of a URL (e.g., the token request merely includes the name of the entity), detection subsystem 114 may determine a URL associated with the entity. As an example, detection subsystem 114 may communicate with network 150 to access the Internet. Detection subsystem 114 may use a search engine or other search platform to determine whether a website exists that corresponds to the entity identifier. As an example, detection subsystem 114 may submit a query using the entity identifier in a search bar of a search engine and may select "the most relevant" website (e.g., as the most relevant search result often provides the correct website associated with the entity.) Furthermore, upon detection subsystem 114 submitting the query, detection subsystem 114 may also filter one or more of the search results by location to further narrow the websites that may be associated with the entity. Upon selecting a website that is associated with the entity, detection subsystem 114 may access the website (or webpage) associated with the entity and may perform natural language processing on the webpage of the entity to determine item characteristics of the items available via the entity.

In some embodiments, detection subsystem 114 may perform natural language processing on multiple webpages associated with the entity to determine the one or more item characteristics. For instance, to accurately determine one or more item characteristics (e.g., where there may be conflicting information, or to otherwise obtain different perspectives of the characteristics of such items available via the entity), the system may access multiple websites or webpages related to the entity to determine item characteristics of items available via the entity. For example, detection subsystem 114 may use a search engine or other search platform to determine one or more websites that correspond to an entity identifier of the entity. In some embodiments, detection subsystem 114 may select the top 3 (or other number of) "most relevant" websites that are associated with the entity (e.g., to which items are attempting to be accessed through). For instance, the top "most relevant web sites" may refer to the first 3 web sites (or other number of web sites) returned by the search engine, which may include the entity's homepage/product page, one or more review pages (e.g., crowd-sourced websites), or other websites/webpages associated with the entity and the products that are available via the entity. Additionally or alternatively, detection subsystem 114 may perform natural language processing on the top "most relevant" websites to determine a match between (i) the entity identifier as indicated via the token request and (ii) an entity identifier available via the websites to validate that the top "most relevant websites" are related to the entity to which items are attempting to be accessed through. For example, an entity identifier available via such web sites may be an entity name. Detection subsystem 114 may then use information (e.g., keywords, phrases, etc.) obtained via the natural language processing of the top "most relevant" websites to determine item characteristics of the items available via the entity. In this way, the system may determine more accurate item characteristic information from a variety of websites, which in turn may generate more accurate predictions or determinations to whether the entity satisfies the one or more entity characteristics (to which the token is bound).

In some embodiments, token subsystem 112 may determine whether the entity satisfies the one or more entity characteristics. For example, token subsystem 112 may determine, based on one or more of the item characteristics, whether the entity satisfies the one or more entity characteristics to which the token is bound.

In some embodiments, determining whether the entity satisfies the one or more entity characteristics to which the token is bound may be based on a prediction model. For example, as making such determination is often complex (e.g., varying item characteristics and varying entity characteristics), it may be advantageous to use a trained prediction model to determine whether the entity satisfies the one or more entity characteristics of the token.

Token subsystem 112 may obtain one or more models configured for determining whether the entity (e.g., to which the item attempting to be accessed through) satisfies the entity characteristics (e.g., to which the token is bound). For example, token subsystem 112 may communicate with model subsystem 118 to obtain one or more models stored in model database 136. For instance, the models in model database 136 may be prediction models configured for determining whether an entity satisfies entity characteristics to which the token is bound, such as Neural Networks (NN), Convolutional Neural Network (CNN), Recurrent Neural Network (RNN), Support Vector Machine (SVM), Deep Learning model, Long Short-Term Memory (LSTM), deep learning, or other models.

In some embodiments, model subsystem 118 may train or configure one or more prediction models to facilitate one or more embodiments described herein. In some embodiments, such models may be used to determine whether an entity satisfies entity characteristics to which the token is bound. As an example, such models may be trained or configured to perform the foregoing functions by respectively mutually mapping input data and output data in nonlinear relationships based on learning (e.g., deep learning). Additionally, one or more pre-trained prediction models may be stored in model database 136.

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
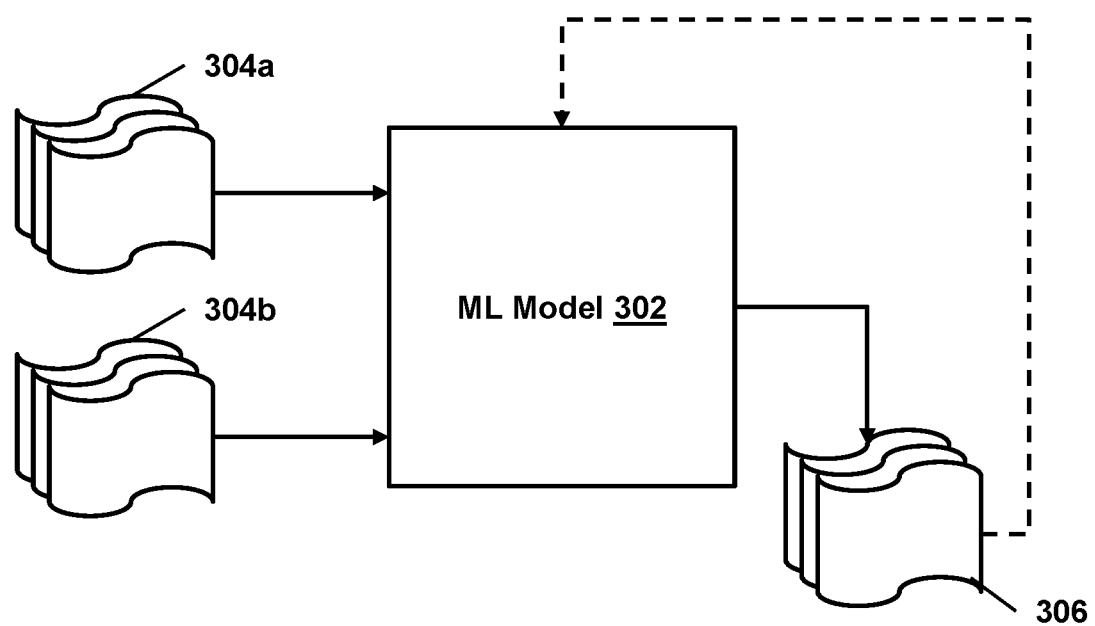
FIG. 3 shows a machine learning model configured to detect text to which a user refers to, in accordance with one or more embodiments.

As an example, with respect to FIG. 3, machine learning model 302 may take input(s) 304 (e.g., inputs 304a or 304b) and provide outputs 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and, in various dimensional forms, may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples, such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some embodiments, machine learning model 302 may be trained based on training data comprising (i) item characteristics, (ii) entity characteristics, and (iii) other item characteristic-related information and other entity characteristic-related information stored in system data database 134. For example, the item characteristics may be characteristics of one or more items (e.g., a quality, a feature, or other phrase or keyword describing the item) such as methods of transportation (e.g., to which the item was delivered or provided), environmental impact information, sustainability information, legality information, legitimacy information, safety information, demographical information, or other item characteristic-related information. As another example, the entity characteristics may be characteristics of one or more entities (e.g., qualities, features, or other phrase or keyword describing an entity) such as whether the entity is an environmentally friendly entity, a legally operating entity, fits a given demographic (e.g., woman owned, minority owned, etc.), provides legal items, is safe to interact with (e.g., protects user's personal data, protects user's financial information, etc.) or other entity characteristic-related information. As discussed above, as the items available via an entity are "telling" about the characteristics of the entity (e.g., to which the items are available from), the characteristics of such items may shed light on the characteristics of the entity. Machine learning model 302 may discover relationships between the characteristics of the items available via the entity and characteristics to which the token is bound to determine whether the entity (e.g., to which the items are available) satisfy the one or more entity characteristics to which the token is bound.

In some embodiments, the training data may be labeled data to be used during supervised machine learning model training of machine learning model 302. For example, in supervised machine learning model training, the item characteristics of the training data may be labeled with one or more characteristics. For instance, an item, such as a smartphone may have an item characteristic of "uses recycled packaging" or "uses no plastic." The associated label may be "environmentally friendly." Additionally, the entity characteristics of training data may be "environmentally friendly." Thus, a machine learning model may be trained based on the labeled item's characteristic information and entity characteristic information to determine whether the item (e.g., the smartphone) includes a characteristic that is "aligned" with the entity characteristic(s) to which the token is bound. Additionally or alternatively, in some embodiments, the training data may be used (e.g., whether labeled or unlabeled) to train machine learning model 302 based on unsupervised machine learning model training. In this way, machine learning model 302 may generate better predictions of whether an entity satisfies one or more entity characteristics to which a token is bound.

As an example, machine learning model 302 may be trained on training data stored in system data database 134. For instance, model subsystem 118 may obtain training data from system data database 134 to train machine learning model 302. As an example, machine learning model 302 may take the training data as input 304, and generate a prediction indicating whether the entity satisfies one or more entity characteristics to which the token is bound as output 306. For instance, input 304a may include training data of one or more item characteristics (e.g., item characteristics of a given entity) and input 304b may include training data of one or more entity characteristics (e.g., to which a token is bound). In some embodiments, the generated prediction(s) may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information).

In some embodiments, machine learning model 302 may be used to generate a prediction indicating whether the entity satisfies one or more entity characteristics to which the token is bound. For example, machine learning model 302 may be configured to receive item characteristics as input 304a and entity characteristics (e.g., to which the token is bound) as input 304b to generate predictions as outputs 306 related to text to whether the entity (e.g., to which a user is attempting to access an item from) satisfies the one or more entity characteristics to which the token is bound. For example, once the item characteristics of items available via an entity are determined, machine learning model 302 may be configured to receive such item characteristics as input to machine learning model 302, as well as the entity characteristics to which the token is bound. Machine learning model 302 may process the inputs and generate a prediction related to whether the entity (e.g., based on the item characteristics of the items available via the entity) satisfies the one or more entity characteristics to which the token is bound. In this way, by using a machine learning model to generate the prediction, the machine learning model may generate robust and accurate predictions as opposed to existing systems reliance on preconfigured databases including information about entities, thereby improving the user experience and generating more accurate predictions. For example, as existing systems rely on databases storing information related to the characteristics of entities, such databases may not be up-to-date (or lack information describing entities in general). Therefore, by using a machine learning model trained on item characteristics of items available via entities and entity characteristics, the machine learning model may generate predictions that are not limited by pre-stored/pre-collected information, but rather, discover relationships between phrases, keywords, or other information between item characteristics and entity characteristics.

In some embodiments, determining whether the entity satisfies the one or more entity characteristics (e.g., to which the token is bound) may be based on a third-party verification source. For example, referring back to FIG. 1, resource subsystem 120 may perform web scraping to identify a third-party verification source related to verifying entity characteristics to which the token is bound. Resource subsystem 120 may use the entity identifier (e.g., from the token request) and perform web scraping based on the entity identifier to identify a third-party verification source. A third-party verification source may be a website, service, database, or other source of information related to verifying information that is related to an entity. For example, a third-party verification source may be a crowd sourced website where users upload qualities, features, reviews, or other information of entities, a web site that provides certificates of authenticity (e.g., related to entities, related to the products of entities, etc.), a social network, market intelligence websites (e.g., including environmental, social, and corporate governance (ESG) scores and the alike), or other third-party verification source. As some entities (e.g., malicious entities) may lie or otherwise deceive users (or systems) of entity characteristics or item characteristics, third-party verification sources may be advantageous to use when determining whether an entity satisfies entity characteristics to which a token is bound. For instance, because the third-party verification sources are indeed "third-party" (e.g., not owned by the entity to which the determination is based on), the third-party verification sources may provide accurate information related to item/entity characteristics as such verification sources are verified or otherwise crowd sourced. In this way, determining whether an entity satisfies entity characteristics to which a token is bound based on a third-party verification source may lead to more accurate determinations—thereby improving the user experience and increasing data security.

Resource subsystem 120 may perform web scraping based on the entity identifier to identify a third-party verification source that is related to verifying entity characteristics to which the token is bound. For example, where the entity identifier is a name of the entity, resource subsystem 120 may perform web scraping to identify a website that (i) is related to verifying the entity characteristics to which the token is bound and (ii) that identifies a characteristic of the entity. Resource subsystem 120 may determine, based on the third-party verification source, a match between the entity characteristics (e.g., to which the token is bound) and a characteristic of the entity. As an example, resource subsystem 120 may obtain the entity characteristics (e.g., to which the token is bound) and compare the entity characteristics to a characteristic of the entity provided by the third-party verification source. To clarify, the third-party verification source may provide information related to a variety of entity characteristics of a given entity. Resource subsystem 120 may compare the entity characteristics to which the token is bound to determine a match between an entity characteristic provided by (or hosted by) the third-party verification source. For example, if the token is bound to an entity characteristic of "woman owned," resource subsystem 120 may determine whether there is a match of "woman owned" via the third-party verification source. As another example, if the token is bound to an entity characteristic of "environmentally friendly," resource subsystem 120 may determine whether there is a match of "environmentally friendly" or a provided ESG score via the third-party verification source. Based on the matching, resource subsystem 120 may determine that the entity satisfies the one or more entity characteristics to which the token is bound.

In some embodiments, where a score (or other value) is provided via a third-party verification source, resource subsystem 120 may determine a match between the entity characteristics (e.g., to which the token is bound) and a characteristic of the entity based on the score satisfying a threshold value. For example, where the third-party verification source provides an ESG score, such score may be indicative of the impact of environmental, social, and corporate governance a given entity is associated with (e.g., the higher the score, the more environmentally sustainable the entity is). For instance, where the token is bound to the entity characteristic of "environmentally friendly" or "environmentally sustainable," resource subsystem 120 may determine a match between the entity characteristics (e.g., to which the token is bound) and a characteristic of the entity if the ESG score provided on the third-party verification source satisfies a threshold ESG score. The threshold value may be a predetermined value (e.g., number) such as 5, 10, 20, 30, etc. Resource subsystem 120 may determine whether the score (e.g., provided by the third-party verification source) meets or exceed the threshold value. For example, where an ESG score is provided by the third-party verification source, such as 60 (e.g., for a given entity), and the threshold score is 50, and the token is bound to the entity characteristic of "environmentally sustainable," resource subsystem 120 may determine a match between the entity characteristics (e.g., to which the token is bound) and the characteristic of the entity due to the score being above the threshold score. It should be noted, in other embodiments, where the score (or other value) is measured on a different metric (e.g., not an ESG score), the score (provided by the third-party verification source) may satisfy a threshold score (or other value) where the score fails to meet or exceeds the threshold score.

In some embodiments, determining whether the entity satisfies the one or more entity characteristics may be based on a database information. For example, system data database 134 may store information related to entities and characteristics of the entities. Such information may include entity identifiers, characteristics of the entities, whether the entity is approved (or has been approved in the past), whether the entity is restricted (or has been restricted in the past), or other entity and entity-characteristic related information. The information stored in system data database 134 may be stored in a data structure, such as a list, array, dictionary, graph, tree, or other data structure. In some embodiments, system data database 134 may store a set of entities and a set of entity characteristics for each entity, where each entity is associated with a set of entity characteristics. Additionally, for each entity of the set of entities (e.g., stored in system data database 134), each entity may be associated with an approval indicator (e.g., indicating whether or not the entity is "approved" or "restricted"). For example, approved entities may refer to entities that users are able to or authorized to interact with (e.g., access items through). Approved entities may be entities that are determined to be safe, legitimate, legal, or otherwise approved based on the given entity's entity characteristics and item characteristics of items available via the entity. Conversely, restricted entities may refer to entities that users are restricted or prohibited from interacting with, such as entities that are determined to be unsafe, illegitimate, illegal, or otherwise restricted based on the given entity's entity characteristics. As an example, an entity with the entity identifier of EntityA may be associated with the entity characteristics of legal, environmentally friendly, and woman owned. An entity with the entity identifier of EntityB may be associated with the entity characteristics of minority owned and philanthropic. As yet another example, an entity with the entity identifier of EntityC may be associated with the entity characteristics of illegal, environmentally unsustainable, and harmful. Each of EntityA, EntityB, and EntityC may each also be associated with an approval indicator denoting whether such entity is an "approved" or "restricted entity." In some embodiments, the approval indicator may be based on entity characteristics to which the token is bound, a predetermined approval/restriction, a threshold amount of entity characteristics that are satisfied between the corresponding given entity and the entity characteristics to which the token is bound, or other information.

In some embodiments, as token subsystem 112 determines entities that satisfy the entity characteristics to which the token is bound, token subsystem 112 may add such entities to the approved entities data structure (e.g., approved entities list, approved entities array, etc.). Similarly, as entities that do not satisfy the entity characteristics to which the token is bound, token subsystem 112 may add such entities to the restricted entities data structure (e.g., restricted entities list, restricted entities array, etc.). In this way, the system may keep the most up to date information for determining whether entities satisfy entity characteristics to which the token is bound, thereby improving the user experience.

Token subsystem 112 may query system data database 134 using an entity identifier. For example, where system data database 134 stores information related to approved entities, restricted entities, or other entity-related information, token subsystem 112 may quickly identify whether an entity (e.g., to which a user is attempting to access an item through/from) satisfies entity characteristics (e.g., to which the token is bound). Token subsystem 112 may determine a match between the entity identifier (e.g., of the token request) and an entity identifier of an approved entity of the set of approved entities (e.g., from system data database 134). Based on the match, token subsystem 112 may determine that the entity (e.g., of the token request) satisfies one or more entity characteristics to which the token is bound (e.g., due to the set of approved entities sharing entity characteristics to which the token is bound).

In one use case, where the token is a virtual card number, and the token request is a temporary authorization including a merchant identifier, token subsystem 112 may query system data database 134 to determine whether the merchant identifier (e.g., of the temporary authorization) matches a merchant identifier stored in system data database 134. For instance, where the merchant identifier of the temporary authorization corresponds to "Merchant1," token subsystem 112 may query system data database 134 to determine a match between "Merchant1" and a merchant identifier stored in system data database 134. If token subsystem 112 determines a match between "Merchant1" (e.g., of the temporary authorization) and a merchant identifier of "Merchant1" stored in system data database 134, token subsystem 112 may determine that the entity merchant satisfies one or more entity characteristics to which the token is bound.

In some embodiments, validation subsystem 116 may validate access (e.g., enable access) to an item associated with the entity based on the entity satisfying the one or more entity characteristics to which the token is bound. Based on a determination that an entity (e.g., to which a user is attempting to access an item through) satisfies the one or more entity characteristics to which the token is bound, validation subsystem 116 may validate access to the item. For example, due to the entity satisfying the one or more entity characteristics to which the token is bound, validation subsystem 116 may allow the user to access the item (e.g., the item may be provided to the user). As another example, where the entity does not satisfy any of the entity characteristics (e.g., to which the token is bound), validation subsystem 116 may prevent access to the item (e.g., the item may not be provided or accessed to/by the user).

In one use case, where the entity is a streaming service and the item is a movie, upon token subsystem 112 determining that the streaming service satisfies one or more entity characteristics to which the token is bound, validation subsystem 116 may allow the user to access the movie. For instance, the movie may be provided to the user such that the user may watch or view the movie. In another use case, where the entity is an online retailer and the item is a sweatshirt, token subsystem 112 may determine that the online retailer satisfies the one or more entity characteristics (e.g., environmentally friendly) to which a user's virtual card number is bound. As such, validation subsystem 116 may allow the user to purchase the sweatshirt.

In some embodiments, validating access to the item associated with the entity may be based on the entity satisfying a threshold value of the one or more entity characteristics (e.g., to which the token is bound). Although a given entity may satisfy one entity characteristic to which the token is bound, it may be advantageous to determine whether the entity satisfies multiple entity characteristics to which the token is bound. For example, malicious entities may attempt to circumvent existing systems by masking their identity (e.g., via an entity identifier that is semantically similar or fake to a non-malicious entity) to trick verification methods of existing systems into validating access to the entity (or items available via the entity). As such, validating (e.g., enabling) access to an item merely based on "one level" of verification may not be sufficient and may cause a poor user experience and data security issues. By validating access to an item associated with an entity based on the entity satisfying a threshold value of entity characteristics (e.g., to which the token is bound), the user experience may be improved while maintaining a higher level of data security.

In some embodiments, validation subsystem 116 may determine whether the entity satisfies a threshold value of the one or more entity characteristics to which the token is bound. The threshold value may be a number, percentage, ratio, or other value. In some embodiments, the threshold value may be a predetermined threshold value. For example, to increase data security, the threshold value may be the number 3 (e.g., indicating that the entity must satisfy at least 3 entity characteristics to which the token is bound). As another example, the threshold value may be 50% (e.g., indicating that the entity must satisfy at least 50% of the entity characteristics to which the token is bound). In some embodiments, satisfying the threshold value may indicate that the entity meets or exceeds the threshold value. For example, validation subsystem 116 may obtain the item characteristics (e.g., of the items available via the entity) and may determine whether a matching number of item characteristics (e.g., with respect to the entity characteristics to which the token is bound) meet or exceed the threshold value.

In one use case, the token may be bound to 3 entity characteristics, such as "environmentally friendly," "legal," "woman owned," and a threshold value of entity characteristics may be 2. Validation subsystem 116 may determine whether item characteristics of items available via the entity (e.g., to which a user is attempting to access items from) meet or exceed at least 2 matching entity characteristics. For example, item characteristics of items available via EntityA may be associated with the item characteristics of "environmentally friendly," "legal," and "locally resourced." Validation subsystem 116 may determine a match between one or more item characteristics of items available via EntityA and the entity characteristics to which the token is bound. Using the matching item characteristics (e.g., "environmentally friendly" and "legal") of items available via EntityA and the entity characteristics to which the token is bound (e.g., also "environmentally friendly" and "legal"), validation subsystem 116 may further determine whether the threshold value of entity characteristics is satisfied. For example, in this case, because EntityA indeed has 2 item characteristics matching 2 entity characteristics (e.g., to which the token is bound), validation subsystem 116 may validate access to the item.

In some embodiments, access to an item associated with an entity that does not satisfy one or more entity characteristics to which the token is bound may be validated based on validation of access to another item associated with another entity that satisfies one or more entity characteristics to which the token is bound. In some cases, although a user is attempting to access an item that is associated with an entity that does not satisfy one or more entity characteristics to which a token is bound, the user may access such item when the user also attempts to access an item that it associated with an entity that satisfies the one or more entity characteristics to which the token is bound. For example, existing systems may have no mechanism to validate access to items that are associated with conflicting entities and may lead to a poor user experience. For instance, a user attempting to watch two movies, where one movie is associated with a large corporation (e.g., large film producer) and a second movie is associated with a small corporation (e.g., small film producer), may be prevented from watching the movies because the token may be bound to an entity characteristic of "small corporation," which may lead to a poor user experience. Therefore, in some embodiments, to improve the user experience, validation subsystem 116 may validate access to an item associated with an entity that does not satisfy one or more entity characteristics to which the token is bound based on validation of access to another item associated with an entity that satisfied one or more entity characteristics to which the token is bound.

For example, a token request may include a request to use a token to access one or more first items associated with a first entity and one or more second items associated with a second entity. In some embodiments, detection subsystem 114 may obtain a second entity identifier (e.g., from the token request) and may provide the second entity identifier to token subsystem 112 to determine one or more second item characteristics of items available via the second entity. Based on the one or more second item characteristics of the items available via the second entity, token subsystem 112 may determine that the second entity fails to satisfy any of the one or more entity characteristics to which the token is bound. However, if the first entity is determined to satisfy one or more entity characteristics to which the token is bound, validation subsystem 116 may nevertheless enable access to the second item associated with the second entity (and the first item associated with the first entity) based on the validation indicating that the access to the first item associated with the first entity is valid.

In one use case, where the token is a virtual card number, and the token request is a temporary authorization, a user may be attempting to purchase two items, such as gasoline and a cookie. For instance, the gasoline may be available for purchase through a large gas station that is not environmentally sustainable while the cookie is available for purchase through a small business. Where the virtual card number is bound to the entity characteristics of "small business," and "environmentally friendly," existing systems may simply prevent the user from making such purchase as the entity providing the gasoline does not conform to entity characteristics to which the virtual card number is bound. Alternatively, existing systems may only allow the user to purchase the cookie, but not the gasoline, which results in a poor user experience. To overcome this, token subsystem 112 may obtain, based on the temporary authorization, entity identifiers corresponding to the merchants that provide the gasoline and the cookie. Token subsystem 112 may then determine, based on the obtained entity identifiers, item characteristics of the items available via the entities (e.g., the gasoline merchant and the cookie merchant). Using the determined item characteristics, token subsystem 112 may determine whether each merchant satisfies entity characteristics to which the virtual card number is bound. Although the gasoline merchant may fail to satisfy any of the entity characteristics to which the virtual card number is bound, the cookie merchant may satisfy such entity characteristics. Therefore, validation subsystem 116 may validate access to both of the items based on the cookie merchant satisfying the entity characteristics to which the virtual card number is bound (or based on the validation of the access to the cookie), thereby improving the user experience.

Figure 4:
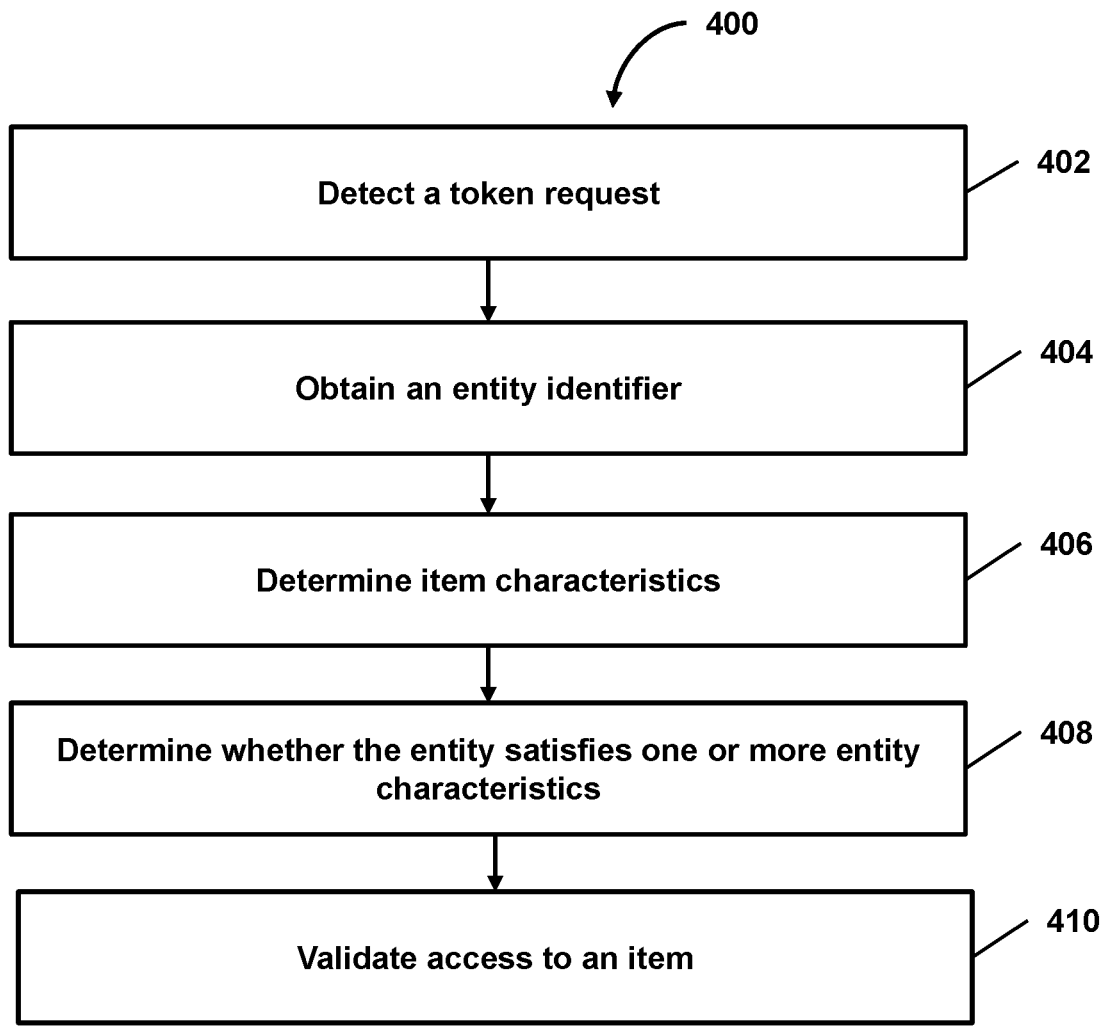
FIG. 4 shows a flowchart of a method for validating network operations related to use of a token via a token request based on entity characteristics, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, a token request may be detected. For example, a token request may be any request related to the use of a token. For instance, the token request may indicate use of the token to access an item associated with an entity. For example, an entity may be any company, merchant, service providers, organizations, or other entities. The token may be bound to one or more entity characteristics. Such entity characteristics may describe or be related to features or qualities of an entity. Operation 402 may be performed by a subsystem that is the same as or similar to detection subsystem 114, in accordance with one or more embodiments.

In an operation 404, an entity identifier may be obtained. For example, an entity identifier associated with the entity may be obtained based on the token request. For instance, the entity identifier may be an identifier that identifies an entity such as an entity value (e.g., an alphanumeric value, numeric value, or other value), an entity name (e.g., a text string, alphanumeric string, etc.), an entity category (e.g., a general category of the entity), a URL associated with the entity, or other entity-related information that identifies the entity. Operation 404 may be performed by a subsystem that is the same as or similar to token subsystem 112, in accordance with one or more embodiments.

In an operation 406, item characteristics may be determined. For example, based on the obtained entity identifier, one or more item characteristics of items available via the entity may be determined. For instance, item characteristics may refer to features, qualities, or other characteristics of items. Operation 406 may be performed by a subsystem that is the same as or similar to token subsystem 112, in accordance with one or more embodiments.

In an operation 408, determining whether the entity satisfies one or more entity characteristics may occur. For example, based on the one or more item characteristics (e.g., of one or more items available via the entity), a determination may be made regarding whether the entity satisfies one or more entity characteristics to which the token is bound. For instance, as the items available via an entity may "shed light" upon characteristics of an entity as a whole, determining whether the entity satisfies entity characteristics to which the token is bound may be performed accurately using the item characteristics of items available via the entity. Operation 408 may be performed by a subsystem that is the same as or similar to token subsystem 112, in accordance with one or more embodiments.

In an operation 410, access to an item may be validated. For example, validating access to the item associated with the entity may be based on the determination indicating that the entity satisfies the one or more entity characteristics to which the token is bound. For instance, the user may be provided with the item (e.g., associated with the entity) where the entity satisfies (or otherwise conforms) to the entity characteristics to which the token is bound. Operation 410 may be performed by a subsystem that is the same as or similar to validation subsystem 116.

In some embodiments, the various computers and subsystems illustrated in FIG. 1 may include one or more computing devices that are programmed to perform the functions described herein. The computing devices may include one or more electronic storages (e.g., database(s) 132, which may include system data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically store information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method, the method comprising: detecting a token request indicating use of a token to access an item associated with an entity, wherein the token is bound to one or more entity characteristics; obtaining, based on the token request, an entity identifier associated with the entity; determining, based on the obtained entity identifier, one or more item characteristics of items available via the entity; determining, based on the one or more item characteristics, whether the entity satisfies the one or more entity characteristics to which the token is bound; and validating access to the item associated with the entity based on the determination indicating that the entity satisfies the one or more entity characteristics to which the token is bound.

2. The method of the preceding embodiment, wherein determining the one or more item characteristics of items available via the entity comprises: determining, based on the entity identifier, a uniform resource locator (URL) associated with the entity; accessing a webpage of the entity via the URL; and performing natural language processing on the webpage of the entity to determine the one or more item characteristics of items available via the entity.

3. The method of embodiment 1, wherein determining the one or more item characteristics of items available via the entity comprises: performing web scraping, based on the obtained entity identifier, to determine one or more item characteristics of items available via the entity, the one or more item characteristics being related to one or more entity characteristics of the entity.

4. The method of any of the preceding embodiments, wherein determining whether the entity satisfies the one or more entity characteristics to which the token is bound further comprises: providing, (i) the one or more determined item characteristics and (ii) the one or more entity characteristics to which the token is bound, to a prediction model to generate a prediction related to whether the entity satisfies the one or more entity characteristics to which the token is bound.

5. The method of any of embodiments 1-3, wherein determining whether the entity satisfies the one or more entity characteristics to which the token is bound further comprises: querying, based on the obtained entity identifier, a database storing a set of approved entities, wherein the set of approved entities are each associated with a second entity identifier, respectively; determining, based on the query, a match between the obtained entity identifier and a second entity identifier of an approved entity of the set of approved entities; determining, based on the matching, that the entity satisfies the one or more entity characteristics to which the token is bound.

6. The method of any of embodiments 1-3, wherein determining whether the entity satisfies the one or more entity characteristics to which the token is bound further comprises: performing web scraping, based on the obtained entity identifier, to identify a third-party verification source, wherein the third-party verification source is related to verifying the one or more entity characteristics to which the token is bound, and wherein the third-party verification source identifies a characteristic of the entity; determining, based on the third-party verification source, a match between the one or more entity characteristics to which the token is bound and the characteristic of the entity; and in response to the matching, determining that the entity satisfies the one or more entity characteristics to which the token is bound.

7. The method of any of the preceding embodiments, preventing access to the item associated with the entity based on the determination indicating that the entity does not satisfy any of the one or more entity characteristics to which the token is bound.

8. The method of any of the preceding embodiments, detecting a second token request indicating use of the token to access the item associated with the entity and a second item associated with a second entity; obtaining, based on the second token request, a second item identifier associated with the second entity; determining, one or more second item characteristics of second items available via the second entity; determining, based on the one or more second item characteristics, that the second entity fails to satisfy any of the one or more entity characteristics to which the token is bound; and validating access to the second item associated with the second entity based on the validation of the access to the item associated with the entity.

9. The method of any of the preceding embodiments, wherein validating access to the item comprises the entity providing the item to a user, wherein the user is associated with the token.

10. The method of any of the preceding embodiments, wherein validating access to the item associated with the entity further comprises: determining that the entity satisfies a threshold value of the one or more entity characteristics to which the token is bound; and validating the access to the item associated with the entity based on the determination indicating that the entity satisfies the threshold value of the one or more entity characteristics to which the token is bound.

11. The method of any of the preceding embodiments, wherein the token comprises an entity-characteristic-restricted token.

12. The method of any of the preceding embodiments, wherein the token comprises a web token.

13. A tangible, non-transitory, machine-readable medium storing instructions that, when executed by a data processing apparatus, cause the data processing apparatus to perform operations comprising those of any of the foregoing method embodiments.

14. A system comprising: one or more processors; and memory storing instructions that, when executed by the processors, cause the processors to effectuate operations comprising those of any of the foregoing method embodiments.

What is claimed is:

1. A system for validating network operations related to use of web tokens via token requests based on entity characteristics to prevent malicious or nonaligned usage, the system comprising:
   one or more processors and non-transitory computer-readable media comprising instructions that, when executed by the one or more processors, cause operations comprising:
   detecting a token request, transmitted over a computer network from a web browser application of a user device associated with a user, indicating use of a web token associated with the user to access a first item associated with a first entity, wherein the web token is bound to one or more entity characteristics related to one or more items available via one or more entities;
   obtaining, based on the token request, an entity identifier that identifies the first entity;
   performing, based on the obtained entity identifier, web scraping to determine one or more item characteristics of items available via the first entity, wherein the one or more item characteristics are different than the one or more entity characteristics;
   providing, (i) the one or more determined item characteristics and (ii) the one or more entity characteristics to which the web token is bound, to a prediction model to generate a prediction related to whether the first entity is associated with the one or more entity characteristics to which the web token is bound; and
   validating access to the first item associated with the first entity based on the prediction indicating that the first entity is associated with the one or more entity characteristics to which the web token is bound.

2. The system of claim 1, further comprising:
   detecting a second token request indicating use of the web token associated with the user to access (i) the first item associated with the first entity and (ii) a second item associated with a second entity;
   obtaining, based on the second token request, a second entity identifier associated with the second entity, wherein the second entity identifier identifies the second entity;
   performing second web scraping, based on the obtained second entity identifier, to determine one or more second item characteristics of second items available via the second entity, the one or more second item characteristics being related to one or more second entity characteristics of the second entity;
   providing, (i) the one or more second item characteristics and (ii) the one or more entity characteristics to which the web token is bound, to the prediction model to generate a second prediction related to whether the second entity is associated with at least one of the one or more entity characteristics to which the web token is bound;

determining, based on the second prediction, that the second entity is not associated with any of the one or more entity characteristics to which the web token is bound; and validating access to the second item associated with the second entity based on the prediction indicating that the first entity is associated with at least one of the one or more entity characteristics to which the web token is bound.

3. A method comprising:

detecting a token request, transmitted over a computer network from an application of a user device associated with a user, indicating use of a token to access an item associated with an entity, wherein the token is bound to one or more entity characteristics;

obtaining, based on the token request, an entity identifier associated with the entity;

performing web scraping using the obtained entity identifier to determine one or more item characteristics of items available via the entity, wherein the one or more item characteristics are different than the one or more entity characteristics;

determining, based on providing (i) the one or more item characteristics and (ii) the one or more entity characteristics to a prediction model, whether the entity satisfies the one or more entity characteristics to which the token is bound; and validating access to the item associated with the entity based on the determination of whether the entity satisfies the one or more entity characteristics to which the token is bound indicating that the entity satisfies the one or more entity characteristics to which the token is bound.

4. The method of claim 3, wherein the determining of the one or more item characteristics of the items available via the entity comprises:

determining, based on the obtained entity identifier, a uniform resource locator (URL) associated with the entity;

accessing a webpage of the entity via the URL; and performing natural language processing on the webpage of the entity to determine the one or more item characteristics of the items available via the entity.

5. The method of claim 3, wherein the one or more item characteristics are related to the one or more entity characteristics of the entity.

6. The method of claim 3, wherein providing, (i) the one or more determined item characteristics and (ii) the one or more entity characteristics, to the prediction model causes the prediction model to generate a prediction related to whether the entity satisfies the one or more entity characteristics to which the token is bound.

7. The method of claim 3, wherein the determining of whether the entity satisfies the one or more entity characteristics to which the token is bound further comprises:

querying, based on the obtained entity identifier, a database storing a set of approved entities, wherein the set of approved entities are each associated with a second entity identifier, respectively;

determining, based on the query, a match between the obtained entity identifier and a second entity identifier of an approved entity of the set of approved entities; and determining, based on the matching, that the entity satisfies the one or more entity characteristics to which the token is bound.

8. The method of claim 3, wherein the determining of whether the entity satisfies the one or more entity characteristics to which the token is bound further comprises:

performing second web scraping, based on the obtained entity identifier, to identify a third-party verification source, wherein the third-party verification source is related to verifying the one or more entity characteristics to which the token is bound, and wherein the third-party verification source identifies a characteristic of the entity;

determining, based on the third-party verification source, a match between the one or more entity characteristics to which the token is bound and the characteristic of the entity; and in response to the matching, determining that the entity satisfies the one or more entity characteristics to which the token is bound.

9. The method of claim 3, further comprising:

preventing access to the item associated with the entity based on the determination of whether the entity satisfies the one or more entity characteristics to which the token is bound indicating that the entity does not satisfy any of the one or more entity characteristics to which the token is bound.

10. The method of claim 3, further comprising:

detecting a second token request indicating use of the token to access the item associated with the entity and a second item associated with a second entity;

obtaining, based on the second token request, a second entity identifier associated with the second entity;

determining, based on the second entity identifier, one or more second item characteristics of second items available via the second entity;

determining, based on the one or more second item characteristics, that the second entity fails to satisfy any of the one or more entity characteristics to which the token is bound; and validating access to the second item associated with the second entity based on the validation of the access to the item associated with the entity.

11. The method of claim 3, wherein the validating of the access to the item associated with the entity comprises the entity providing the item to the user, wherein the user is associated with the token.

12. The method of claim 3, wherein the validating of the access to the item associated with the entity further comprises:

determining that the entity satisfies a threshold value of the one or more entity characteristics to which the token is bound; and validating the access to the item associated with the entity based on the determination of whether the entity satisfies the one or more entity characteristics to which the token is bound indicating that the entity satisfies the threshold value of the one or more entity characteristics to which the token is bound.

13. One or more non-transitory computer-readable media comprising instructions that, when executed by one or more processors, cause operations comprising:

detecting a token request, transmitted over a computer network from an application associated with a user device, indicating use of a token to access an item associated with an entity, wherein the token is bound to one or more entity characteristics;

obtaining, based on the token request, an entity identifier associated with the entity, wherein the entity identifier identifies the entity;

performing web scraping based on the obtained entity identifier to determine one or more item characteristics of items available via the entity, wherein the one or more item characteristics are different than the one or more entity characteristics;

determining, via a prediction model's prediction based on (i) the one or more item characteristics and (ii) the one or more entity characteristics, whether the entity satisfies the one or more entity characteristics to which the token is bound; and validating access to the item associated with the entity based on the determination of whether the entity satisfies the one or more entity characteristics to which the token is bound indicating that the entity satisfies the one or more entity characteristics to which the token is bound.

14. The media of claim 13, wherein the determining of the one or more item characteristics of the items available via the entity comprises:

determining, based on the obtained entity identifier, a uniform resource locator (URL) associated with the entity;

accessing a webpage of the entity via the URL; and performing natural language processing on the webpage of the entity to determine the one or more item characteristics of the items available via the entity.

15. The media of claim 13, the one or more item characteristics are related to the one or more entity characteristics of the entity.

16. The media of claim 13, wherein the determining of whether the entity satisfies the one or more entity characteristics to which the token is bound further comprises:

providing, (i) the one or more determined item characteristics and (ii) the one or more entity characteristics to which the token is bound, to the prediction model to generate a prediction related to whether the entity satisfies the one or more entity characteristics to which the token is bound.

17. The media of claim 13, wherein the determining of whether the entity satisfies the one or more entity characteristics to which the token is bound further comprises:

querying, based on the obtained entity identifier, a database storing a set of approved entities, wherein the set of approved entities are each associated with a second entity identifier, respectively;

determining, based on the query, a match between the obtained entity identifier and a second entity identifier of an approved entity of the set of approved entities; and determining, based on the matching, that the entity satisfies the one or more entity characteristics to which the token is bound.

18. The media of claim 13, wherein the determining of whether the entity satisfies the one or more entity characteristics to which the token is bound further comprises:

performing second web scraping, based on the obtained entity identifier, to identify a third-party verification source, wherein the third-party verification source is related to verifying the one or more entity characteristics to which the token is bound, and wherein the third-party verification source identifies a characteristic of the entity;

determining, based on the third-party verification source, a match between the one or more entity characteristics to which the token is bound and the characteristic of the entity; and in response to the matching, determining that the entity satisfies the one or more entity characteristics to which the token is bound.

19. The media of claim 13, wherein the instructions that, when executed by the one or more processors, further cause operations comprising:

preventing access to the item associated with the entity based on the determination of whether the entity satisfies the one or more entity characteristics to which the token is bound indicating that the entity does not satisfy any of the one or more entity characteristics to which the token is bound.

20. The media of claim 13, wherein the instructions that, when executed by the one or more processors, further cause operations comprising:

detecting a second token request indicating use of the token to access the item associated with the entity and a second item associated with a second entity;

obtaining, based on the second token request, a second entity identifier associated with the second entity;

determining, based on the second entity identifier, one or more second item characteristics of second items available via the second entity;

determining, based on the one or more second item characteristics, that the second entity fails to satisfy any of the one or more entity characteristics to which the token is bound; and validating access to the second item associated with the second entity based on the validation of the access to the item associated with the entity.

* * * * *